US006862807B2

(12) United States Patent
Wissel

(10) Patent No.: US 6,862,807 B2
(45) Date of Patent: Mar. 8, 2005

(54) METHOD OF PRODUCING A STEERING WHEEL SKELETON AND VEHICLE STEERING WHEEL

(75) Inventor: Willi Wissel, Blankenbach (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 10/005,261

(22) Filed: Dec. 3, 2001

(65) Prior Publication Data

US 2002/0069722 A1 Jun. 13, 2002

(30) Foreign Application Priority Data

Dec. 8, 2000 (DE) .......................................... 100 61 087

(51) Int. Cl.⁷ .............................................. B21D 53/76
(52) U.S. Cl. ........................................ 29/894.1; 74/552
(58) Field of Search ................................ 29/894, 894.1, 29/894.325, 894.38; 74/552; 72/206, 208, 252.5

(56) References Cited

U.S. PATENT DOCUMENTS

| | | | |
|---|---|---|---|
| 1,080,080 A | * | 12/1913 | Sessions |
| 1,765,807 A | | 6/1930 | Thomas |
| 1,915,769 A | * | 6/1933 | Thomas ........................ 74/552 |
| 2,174,640 A | | 10/1939 | Sinclair |
| 3,714,844 A | | 2/1973 | Tsuda |
| 3,800,620 A | * | 4/1974 | Barenyi ........................ 74/552 |
| 4,359,911 A | | 11/1982 | Eubanks et al. |
| 5,477,720 A | | 12/1995 | Lentz et al. |
| 6,279,230 B1 | * | 8/2001 | Eikhoff et al. ........... 29/894.38 |
| 6,298,750 B1 | * | 10/2001 | Kerner et al. ................. 74/552 |

FOREIGN PATENT DOCUMENTS

| | | |
|---|---|---|
| DE | 19724073 A1 | 1/1998 |
| FR | 512755 | 1/1921 |
| GB | 1202144 | 9/1970 |

OTHER PUBLICATIONS

European Search Report.

* cited by examiner

*Primary Examiner*—David P. Bryant
(74) *Attorney, Agent, or Firm*—Tarolli, Sundheim, Covell & Tummino, L.L.P.

(57) ABSTRACT

The invention relates to a method of producing a skeleton for a steering wheel rim made of sheet metal, the method comprising the following steps: a flat metal blank is cut in such a way that it has a ring-shaped section, the ring-shaped section is deformed in such a way that it acquires a hollow profile which in cross-section encloses an angle of more than 180°, and the deformation is carried out at least partially in that the ring-shaped section is moved between two rotatable rollers. The invention further relates to a steering wheel produced by the method proposed. Such a steering wheel has a hollow steering wheel rim including a center channel for delivering cooling air. The channel is defined by the open hollow profile and by a shell part placed onto the profile.

8 Claims, 5 Drawing Sheets

METHOD OF PRODUCING A STEERING WHEEL SKELETON AND VEHICLE STEERING WHEEL

TECHNICAL FIELD

The invention relates to a method of producing a skeleton for a vehicle steering wheel and to a vehicle steering wheel that is produced by such method.

BACKGROUND OF THE INVENTION

Known steering wheel skeletons made of sheet metal are usually deformed by deep-drawing and are consequently inexpensive to manufacture. However, deep-drawing essentially only allows the production of U-shaped cross-sectional profiles. In terms of stability, it is better if the profile of the skeleton is bent by more than 180° in the area of the steering wheel rim. Moreover, a further closed hollow profile can easily form a channel inside the steering wheel rim for use in so-called ventilated steering wheels. With such ventilated steering wheels, fresh air is fed to the inside of the steering wheel rim and exits through holes in the steering wheel rim.

BRIEF SUMMARY OF THE INVENTION

The object of the invention is to provide an inexpensive method of producing a skeleton at least for the steering wheel rim by means of which a cross-sectional profile that is bent by more than 180° can be produced at favorable costs.

This is achieved in a method which comprises the following steps: a flat metal blank is cut in such a way that it has a ring-shaped section, the ring-shaped section is deformed in such a way that it acquires a hollow profile which in cross-section encloses an angle $\alpha$ of more than 180°, and the deformation is carried out at least partially in that the ring-shaped section is moved between two rotatable rollers. The rollers roll along the entire periphery of the ring-shaped section, thereby bending this section. This method allows fast and inexpensive deformation as well as bending by approximately 270°, in relation to the cross-section of the profile.

According to the preferred embodiment, however, the entire bending process is not achieved only by the two rollers but rather, in a first step, the flat ring-shaped section is deformed by drawing in such a way that it acquires an essentially U-shaped profile. Only subsequently is the U-profile further closed by means of the deformation between the two rollers. This combination is especially advantageous since drawing can hardly be beaten in terms of costs and it can already carry out most of the deformation work.

Advantageously, after the drawing operation, the U-shaped profile has two legs of differing lengths, in relation to the cross-section. The rollers engage the longer one of the legs and deform it. Since the legs have differing lengths, a roller can come to lie above the shorter leg and does not need to have a filigree shape in order to protrude from the open side of the "U" between the two legs so that it can engage one leg.

Preferably, the rollers engage the radially outer leg of the U-shaped profile and they bend this peripheral tube section radially towards the inside, namely by approximately another 90°, so that the profile encloses approximately 270° after the deformation step.

When the skeleton is used for a ventilated steering wheel, a number of holes should be stamped into the ring-shaped section before the deformation step, so that the metal blank is cut in a single step.

The preferred embodiment provides for that a one-piece metal skeleton with a section for the steering wheel rim, a section for at least one spoke and a section for the hub are formed from a metal blank, the ring-shaped section being deformed as described above, i.e. the outer leg of the U-shaped profile being bent radially towards the inside. This avoids the need for deformation by the rollers in the area of the spokes, where the U-shaped profile becomes an L-shaped profile. The spokes are also preferably deformed into a U-profile by means of the drawing method so that the hollow profiles thus formed in the spoke and in the steering wheel rim can be closed by at least one narrow shell part to form an air-carrying channel.

The invention also relates to a vehicle steering wheel with a one-piece metal skeleton whose ring-shaped section for the steering wheel rim is deformed by means of the method explained above in such a way that the cross-section of the ring-shaped section has an open hollow profile. A shell part is then attached to the hollow profile in order to form a closed channel.

The vehicle steering wheel according to the invention that has holes in the ring-shaped section has at least one fan in the area of the hub that is in flow-connection with the channel in the spoke.

DETAILED DESCRIPTION OF THE PREFERRED EMBODIMENTS

Figure 1:
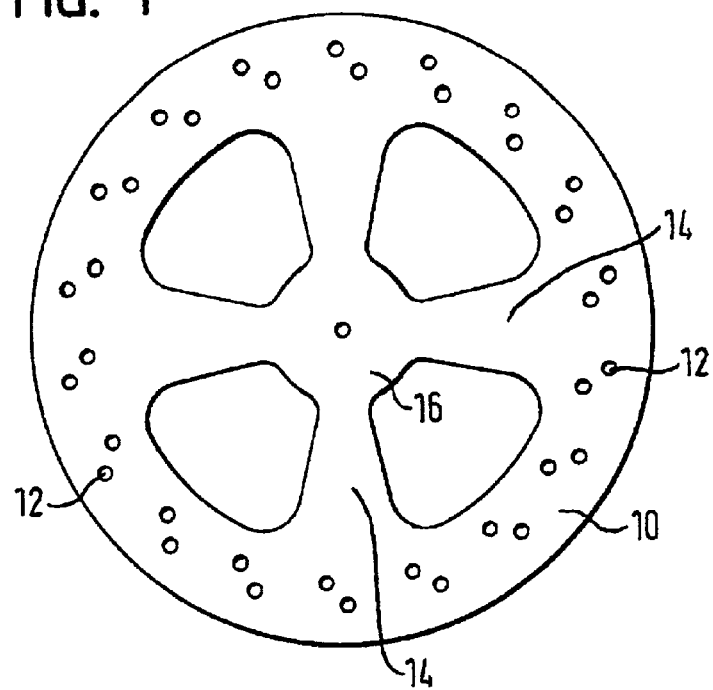
FIG. 1 shows a metal blank that is deformed by means of the method according to the invention into a metal skeleton for a steering wheel according to the invention.

FIG. 1 shows a flat, stamped metal blank for the production of a one-piece steering wheel skeleton. The metal blank has a ring-shaped section 10 that later forms the skeleton section for the steering wheel rim, numerous small holes 12 being stamped in this section 10. The ring-shaped section 10 continues into four sections 14 for the spokes which, in turn, continue into a section 16 for the hub.

Figure 2:
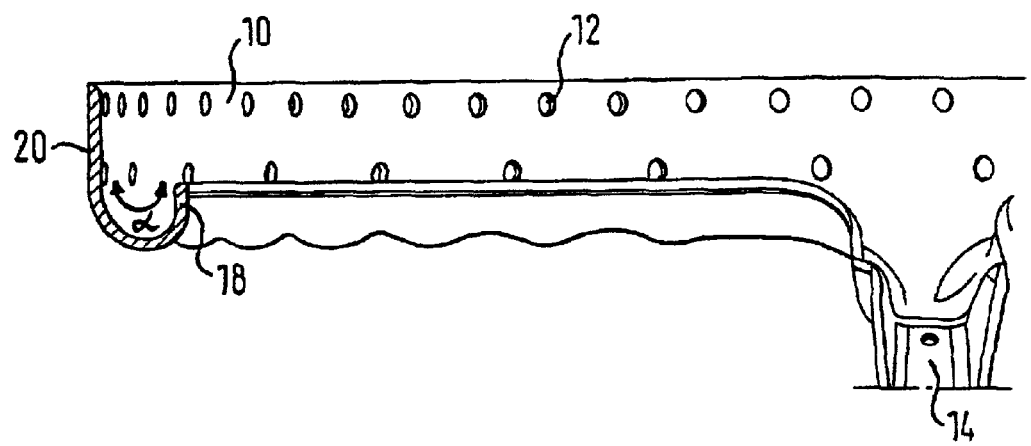
FIG. 2 shows a cross-section through the left-hand half of the metal blank deformed by means of deep-drawing.

The metal blank is deformed in a deep-drawing process in such a way that it acquires the shape shown in FIG. 2. As a result of the deformation, which is done with a 180° bend (see angle $\alpha$ in FIG. 2), the ring-shaped section 10 acquires a U-profile with a shorter, radially inner leg 18 and a longer, radially outer leg 20. The section 14 for the spokes is also deformed into a U-profile, with the leg 18 not being present in the area of the spokes 14.

Figure 3:
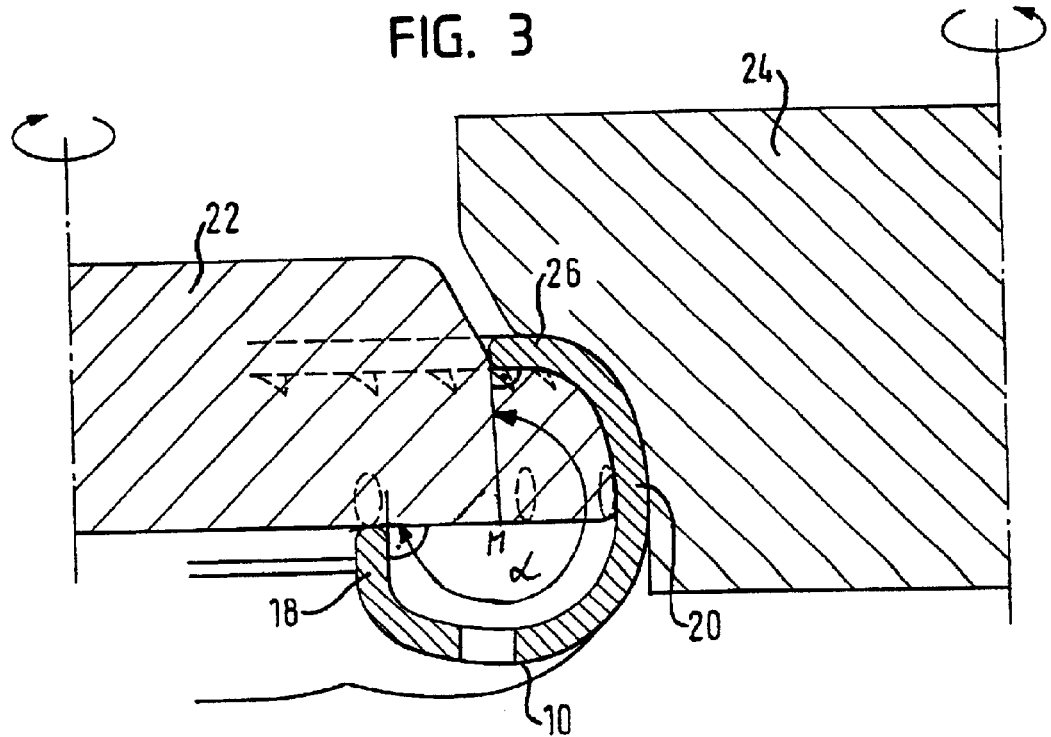
FIG. 3 is an enlarged sectional view in the area of the steering wheel rim during the further deformation by means of two rollers.

In a next method step, the outer leg 20 which, to put it more precisely, forms a surrounding edge is bent radially inwards by at least another 90° between two rollers 22, 24 (see FIG. 3) that are rotating in opposite directions, so that the profile then made encloses an angle α of at least 270° in the ring-shaped section 10. The inner roller 22 extends slightly above the leg 18 as far as to the inner side of the leg 20, and the roller 24 lies against the outer side of the leg 20. The outer roller 24 presses the upper edge 26 of the leg 20 towards inside, and the roller 22 generates a corresponding counterforce.

Figure 4:
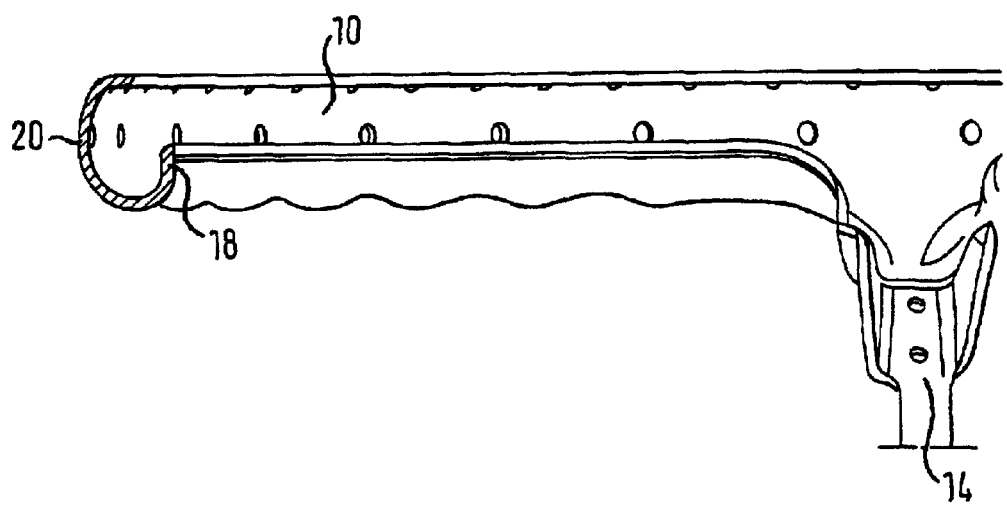
FIG. 4 shows the completely deformed steering wheel skeleton.

FIG. 4 shows the completely deformed steering wheel skeleton. As can be seen, the somewhat less open hollow profile in the area of the ring-shaped section 10 continues into the somewhat more open hollow profile in the area of the spokes 14.

In a subsequent step, shell parts 30 in the area of the spokes 14 and of the ring-shaped section that forms the rim are placed onto the hollow profile. The shells are made of plastic and latch in place on the hollow profile, so that interconnected channels 32 are formed in the steering wheel rim and in the spokes. Finally, the skeleton that has been closed with the shell parts 30 is foam-encapsulated. The reference numeral 34 designates a foamed section. Finally, a leather covering can also be applied. The reference numeral 36 here designates the leather used.

Figure 5:
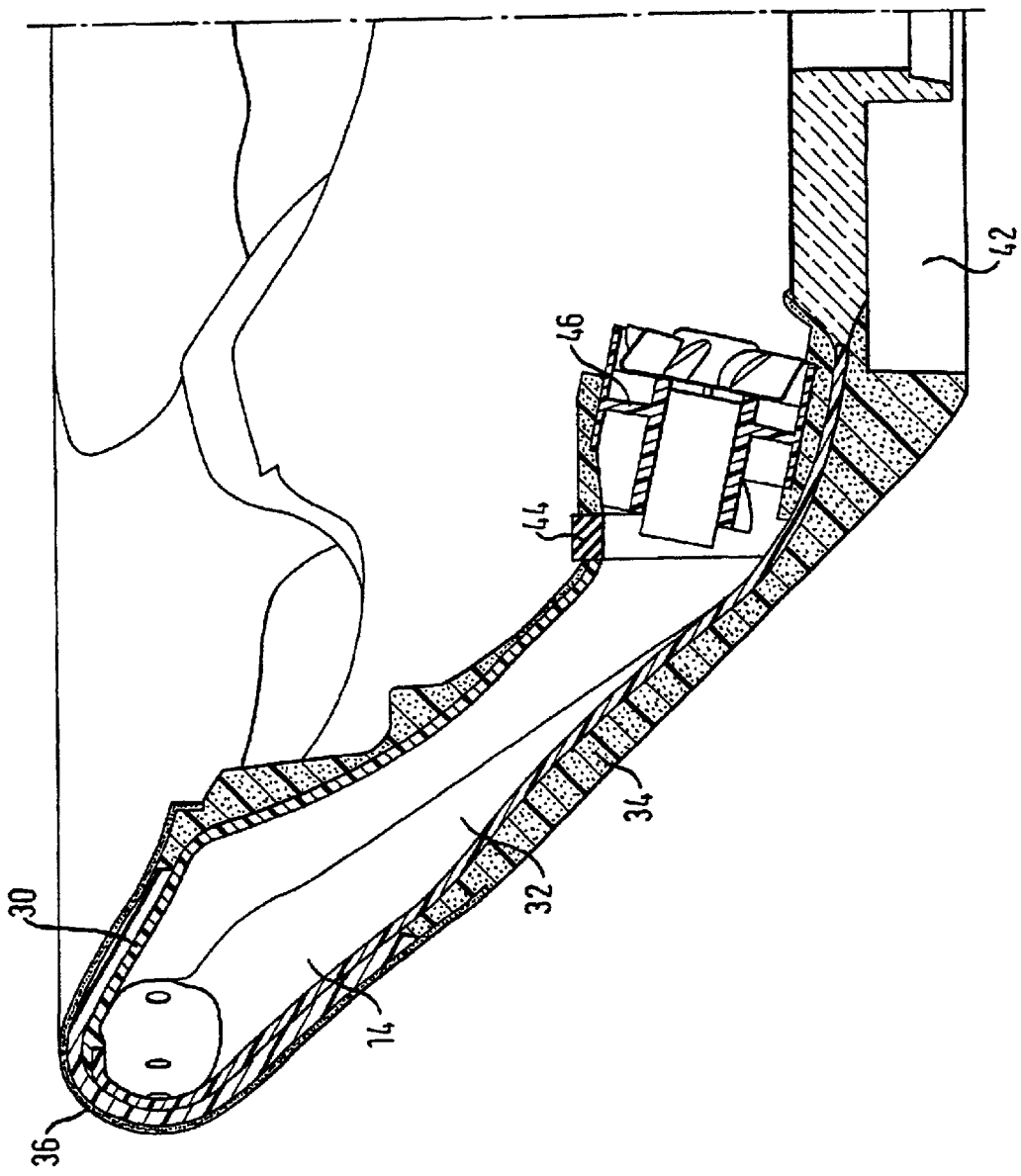
FIG. 5 is a sectional view through the steering wheel according to the invention in a first embodiment.
Figure 6:
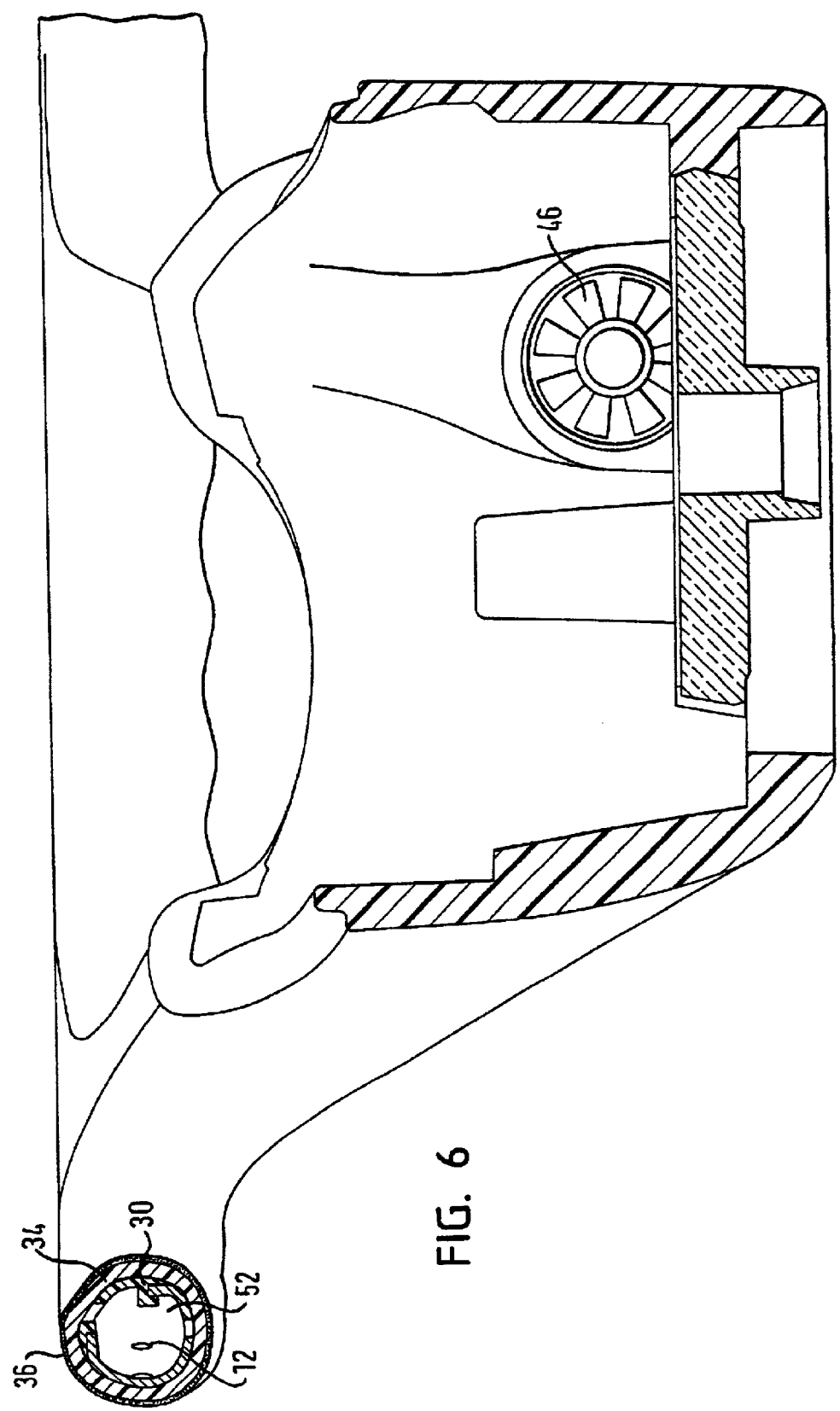
FIG. 6 is a view through the steering wheel blank of FIG. 5 showing a cross-section in the area of the steering wheel rim outside the spokes.

In the area of the hub 42 of the steering wheel, motor-driven fans—according to FIG. 5 an axial fan 46—are attached to the steering wheel skeleton via an elastic sleeve 44 so as to be neutral in terms of vibration. Several axial fans 46 can be used or, if the installation space is sufficient, one more powerful axial fan 46 in the area of a spoke can be used. The axial fan 46 sucks in fresh air and blows it through the channels 32 into the surrounding channel 52 in the steering wheel rim (see FIG. 6). The air flows to the outside via the openings 12.

Axial fans require a high installation space and moreover, if several of them are used, they are difficult to synchronize. Consequently, precautions have to be taken such as, for example, the elastic suspension 44 so that vibration phenomena do not occur.

For this reason, it can be advantageous to use a radial fan, since radial fans require less space in relation to their output. In particular in the case of axial fans, the accommodation close to or in the spokes impairs the design in the area of the spokes.

Figure 7:
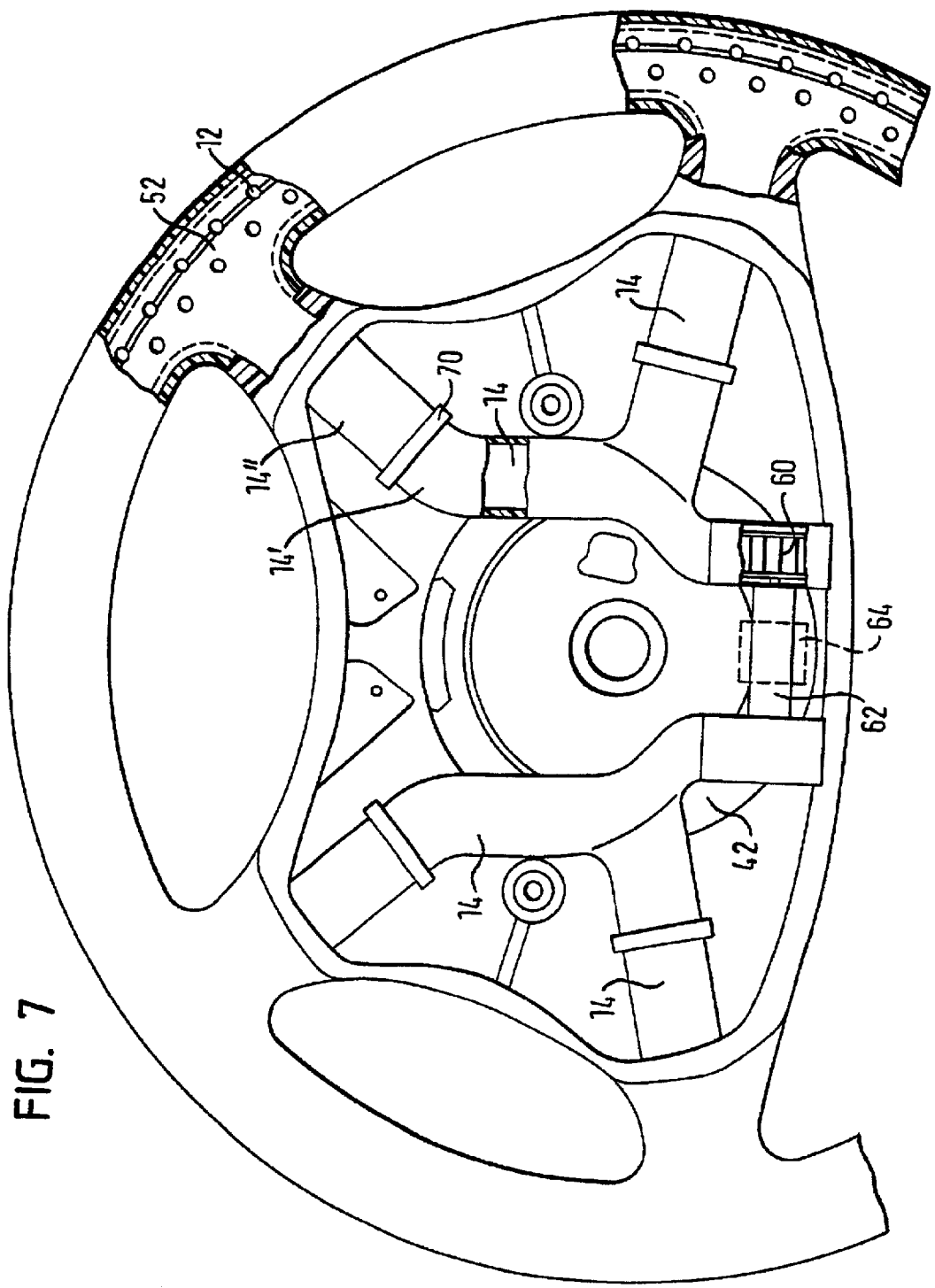
FIG. 7 is a partially cut-away view of the steering wheel according to the invention in a second embodiment.

In FIG. 7, two radial fan blades, of which only the right-hand air blade 60 is shown, are driven by a shared motor 64. Each fan blade 60 supplies two channels in two spokes 14 with air which then reaches the channel 52 in the steering wheel rim.

In this manner, the use of radial fans leads to cost savings. The arrangement of the fans near the hub ensures that there will be less vibration in the area of the steering wheel rim, which can be even further supported in that each spoke has a radially inner and a radially outer channel section 14', 14" that are kept largely vibration-free with respect to each other via an elastic ring 70. Muffling of noises can also be realized more advantageously by positioning the fan in the area of the hub 42.

As an alternative, it is also possible to provide two radial fans that are electronically coupled to each other, since an electronic coupling likewise makes it possible to prevent excessive vibration or even beats.

It is to be noted that the steering wheel according to the invention can comprise any features of the following method claim in any combination.

What is claimed is:

1. A method of producing a skeleton for a steering wheel rim made of sheet metal, said method comprising the steps of:
   cutting a flat metal blank in such a way that it has a ring-shaped section;
   deforming said ring-shaped section in such a way that it acquires a hollow profile which in cross-section encloses an angle of more than 180°, and
   said deforming step is carried out at least partially in that said ring-shaped section is moved between two rotatable rollers, said deforming step including a step in which said flat ring-shaped section is deformed by drawing in such a way that it acquires an essentially U-shaped profile.

2. The method according to claim 1, wherein said U-shaped profile has two legs of differing lengths and said rollers deform the longer one of said legs.

3. The method according to claim 2, wherein said rollers bend said radially outer leg radially inwards.

4. The method according to claim 1, wherein at least one of said rollers has a stepped peripheral surface.

5. The method according to claim 1, wherein said profile encloses at least approximately 270° after said deformation step.

6. The method according to claim 1, wherein before said deformation step, a number of holes is stamped into said ring-shaped section.

7. A method of producing a skeleton for a steering wheel rim made of sheet metal, said method comprising the steps of:
   cutting a flat metal blank in such a way that it has a ring-shaped section, said metal blank having a section for defining at least one spoke and a section for defining a hub, said sections continuing into each other in one piece,
   deforming said ring-shaped section in such a way that it acquires a hollow profile which in cross-section encloses an angle of more than 180°,
   said deforming step is carried out at least partially in that said ring-shaped section is moved between two rotatable rollers, and
   by means of drawing, said ring-shaped section first acquires a U-shaped profile with a radially outer longer leg that is bent radially inwards between said rollers, said section for said spoke being bent into a U-shaped profile by said drawing.

8. A method of producing a skeleton for a steering wheel from sheet metal, said method comprising the following steps:
   providing a flat metal blank,
   cutting the flat metal blank to form a ring-shaped section,
   forming a skeleton for a steering wheel rim by deforming said ring section in such a way that it acquires a hollow profile which in cross-section encloses an angle α of more than 180°, and
   said forming step comprising at least partially deforming said ring-shaped section by moving said ring-shaped section between two rotatable rollers,
   wherein said flat metal blank includes a central hub section and a plurality of spoke sections interconnecting said hub section and said ring-shaped section, said plurality of spoke sections being spaced apart from each other by empty spaces.

* * * * *